(12) United States Patent
Schultz

(10) Patent No.: US 10,748,335 B2
(45) Date of Patent: *Aug. 18, 2020

(54) METHOD FOR THE AUTOMATIC MATERIAL CLASSIFICATION AND TEXTURE SIMULATION FOR 3D MODELS

(71) Applicant: Pictometry International Corp., Rochester, NY (US)

(72) Inventor: Stephen Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,896

(22) Filed: Feb. 4, 2019

(65) Prior Publication Data

US 2019/0251742 A1    Aug. 15, 2019

Related U.S. Application Data

(63) Continuation of application No. 15/964,956, filed on Apr. 27, 2018, now Pat. No. 10,198,847, which is a (Continued)

(51) Int. Cl.
*G06T 17/05* (2011.01)
*G06T 15/00* (2011.01)
(Continued)

(52) U.S. Cl.
CPC ............ *G06T 17/05* (2013.01); *G06T 15/005* (2013.01); *G06T 15/04* (2013.01); *G09G 5/363* (2013.01); *G06T 1/60* (2013.01); *G06T 11/001* (2013.01)

(58) Field of Classification Search
CPC ....... G06T 17/05; G06T 15/005; G06T 15/04; G06T 1/60; G06T 11/001; G09G 5/363
See application file for complete search history.

(56) References Cited

U.S. PATENT DOCUMENTS 5,710,878 A    1/1998 McCoy et al.
6,473,090 B1   10/2002 Mayer
(Continued)

OTHER PUBLICATIONS

Goldberg et al., "Extracting geographic features from the Internet to automatically build detailed regional gazetteers," International Journal of Geographical Information Science, 23:1, 93-128, Jan. 2009.
(Continued)

*Primary Examiner* — Abderrahim Merouan
(74) *Attorney, Agent, or Firm* — Dunlap Codding, P.C.

(57) ABSTRACT

A method of automatically transforming a computerized 3D model having regions of images utilized as textures on one or more physical objects represented in the 3D model (such as building sides and roofs, walls, landscapes, mountain sides, trees and the like) to include material property information for one or more regions of the textures of the 3D model. In this method, image textures applied to the 3D model are examined by comparing, utilizing a computer, at least a portion of each image texture to entries in a palette of material entries. The material palette entry that best matches the one contained in the image texture is assigned to indicate a physical material of the physical object represented by the 3D model. Then, material property information is stored in the computerized 3D model for the image textures that are assigned a material palette entry.

17 Claims, 12 Drawing Sheets

Related U.S. Application Data continuation of application No. 15/142,361, filed on Apr. 29, 2016, now Pat. No. 9,959,667, which is a continuation of application No. 12/605,980, filed on Oct. 26, 2009, now Pat. No. 9,330,494.

(51) Int. Cl.
*G09G 5/36* (2006.01)
*G06T 15/04* (2011.01)
*G06T 11/00* (2006.01)
*G06T 1/60* (2006.01)

(56) References Cited

U.S. PATENT DOCUMENTS

| | | | |
|---|---|---|---|
| 6,735,557 | B1 | 5/2004 | Castellar et al. |
| 7,343,268 | B2 * | 3/2008 | Kishikawa .......... G06F 17/5004 345/419 |
| 9,082,162 | B2 | 7/2015 | Gokturk et al. |
| 2003/0011593 | A1 * | 1/2003 | Takada ............... G06K 9/00201 345/420 |
| 2003/0014224 | A1 * | 1/2003 | Guo .................... G06F 17/5004 703/1 |
| 2003/0021343 | A1 * | 1/2003 | Trovato ..................... G06T 9/00 375/240.08 |
| 2006/0061566 | A1 * | 3/2006 | Verma ..................... G06T 17/00 345/419 |
| 2006/0110026 | A1 * | 5/2006 | Strassenburg-Kleciak .................. G01C 15/00 382/154 |
| 2008/0221843 | A1 | 9/2008 | Shenkar et al. |
| 2009/0141020 | A1 * | 6/2009 | Freund .................. G06T 11/001 345/419 |

OTHER PUBLICATIONS

Extended European Search Report regarding EP App. No. 10828764.0 dated Jul. 12, 2017.
Canadian Intellectual Property Office; Office Action dated Oct. 25, 2016 regarding Canadian Patent Application No. 2,778,267.
European Patent Office, Communication regarding European Patent Application No. 10828764.0, dated May 15, 2018.
Pictometry International Corp., Response to Official Action from the Canadian Intellectual Property Office regarding Canadian Patent Application No. 2,778,267, dated Apr. 19, 2018.
IP Australia, Examination Report No. 2 regarding Australian Patent Application No. 2015275308, dated Jun. 20, 2017.
Pictometry International Corp., Response to Jun. 20, 2017 Examination Report No. 2 regarding Australian Patent Application No. 2015275308, dated Feb. 9, 2018.
Imhof, Ralph K., "Mapping from Oblique Photographs", Manual of Photogrammetry, Chapter 18, 1966.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Mostafa, et al., System Performance Analysis of INS/DGPS Integrated System for Mobile Mapping System (MMS), Department of Geomatics Engineering, University of Calgary, Commission VI, WG VI/4, Mar. 2004.
"POS AV" Applanix, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "Synthetic Aperture Radar Applications", Overview, Orbisat Brochure, Mar. 2007.
European Patent Office; Supplementary Partial European Search Report and Lack of Unity of Invention dated Mar. 21, 2017 regarding European Patent Application No. 10828764.0.
Pictometry International Corp., Response to Oct. 25, 2016 Official Action from the Canadian Intellectual Property Office regarding Canadian Patent Application No. 2,778,267, "A Method for Automatic Material Classification and Texture Simulation for 3D Models," Filed Apr. 25, 2017.
Canadian Intellectual Property Office, Official Action regarding Canadian Patent Application No. 2,778,267, "A Method for Automatic Material Classification and Texture Simulation for 3D Models," dated Oct. 19, 2017.
IP Australia, Examination Report No. 1 regarding Australian Patent Application No. 2018204115 dated Aug. 1, 2019.
Pictometry International Corp., Response letter regarding Summary to attend oral proceedings regarding European Patent Application 10828764.0, mailed Aug. 9, 2019.
Wikipedia, "List of Material Properties," retrieved on Jul. 12, 2018 from https://en.wikipedia.org/w/index.php?title=List_of_materials_properties&oldld=824373391, page lasted updated on Feb. 6, 2018.
Juvinall et al., "Fundamentals of Machine Component Design," 2006, pp. 107-108, Fourth Edition, John Wiley & Sons, Inc., U.S.A.
European Patent Office, "Summons to Attend Oral Hearing," regarding European Patent Application 10828764.0, dated Dec. 12, 2018.
Partial Supplementary European Search Report regarding EP App. No. 10828764.0 dated Mar. 21, 2017, 8 pages.

* cited by examiner

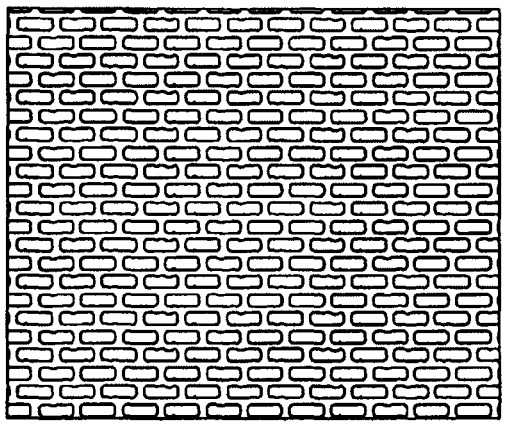
BRICK: (0.86)
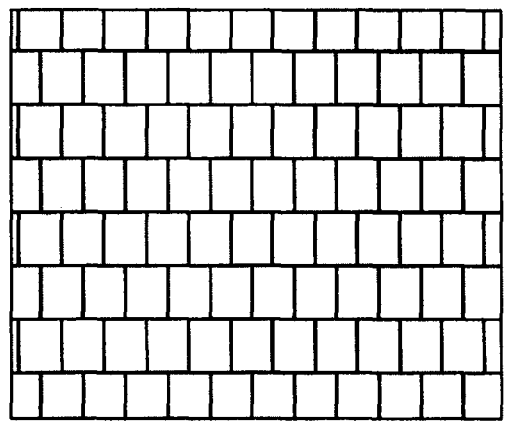
CEMENT BLOCK: (0.74)
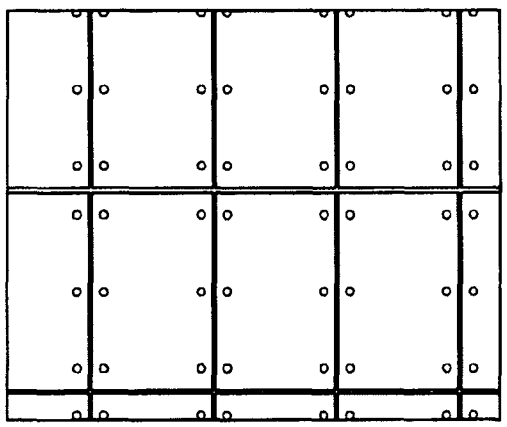
CEMENT: (0.72)
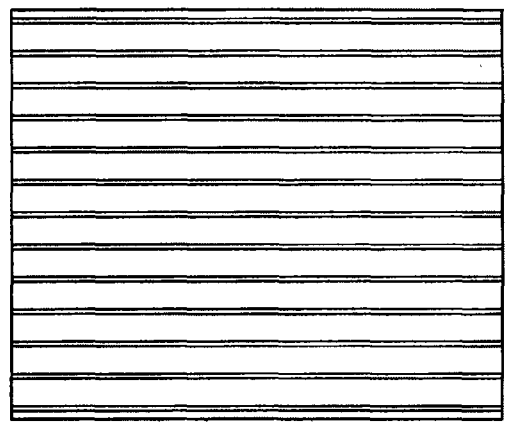
SIDING: (0.21)
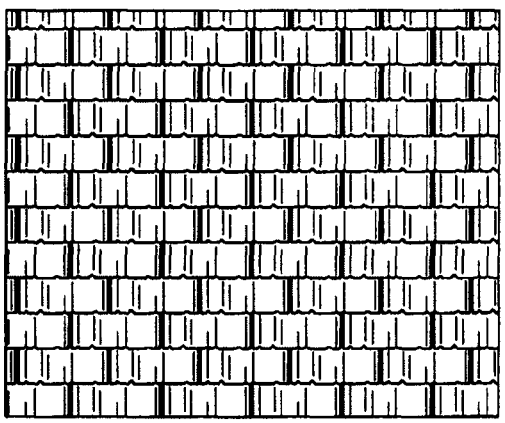
ROOF SHINGLES: (0.12)
MARBLE: (0.45)
FIG. 4

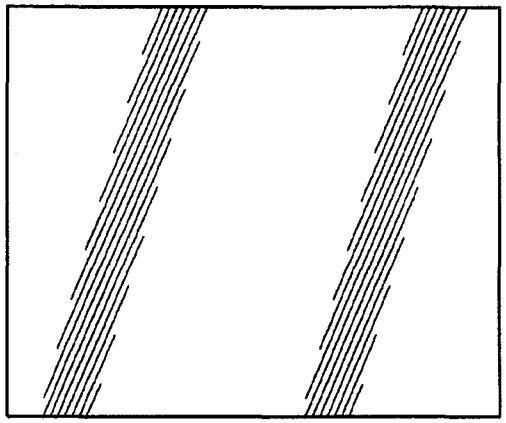
TRANSPARENT GLASS: (0.82)
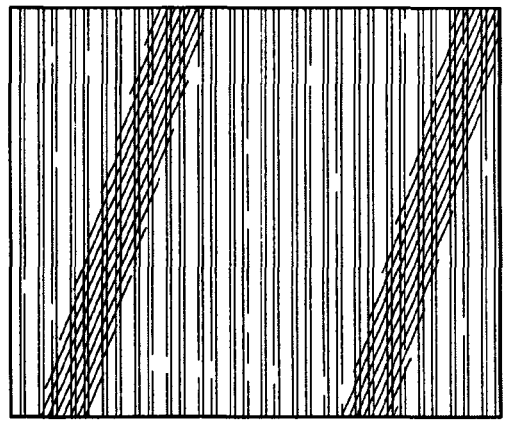
TRANSPARENT CORRUGATED GLASS: (0.36)
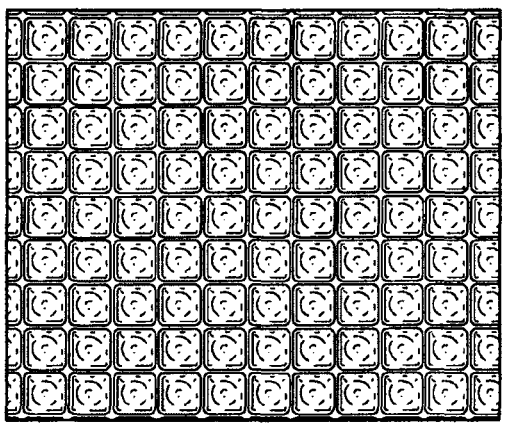
BLOCK GLASS: (0.42)
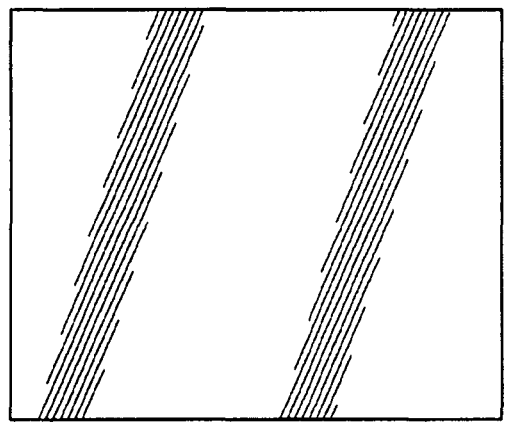
CRUSHED RESIN GLASS: (0.76)
FIG. 8

METHOD FOR THE AUTOMATIC MATERIAL CLASSIFICATION AND TEXTURE SIMULATION FOR 3D MODELS

INCORPORATION BY REFERENCE

This application is a continuation of and claims priority to U.S. patent application Ser. No. 15/964,956 filed Apr. 27, 2018, which is a continuation of and claims priority to U.S. patent application Ser. No. 15/142,361 filed Apr. 29, 2016, now U.S. Pat. No. 9,959,667, which claims priority to and is a continuation of the patent application identified by U.S. Ser. No. 12/605,980, filed Oct. 26, 2009, now U.S. Pat. No. 9,330,494, entitled "Method for the Automatic Material Classification and Texture Simulation for 3D Models", the entire contents of which are hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE § 1.52(E)(5)). THE TOTAL NUMBER OF COMPACT DISCS INCLUDING DUPLICATES AND THE FILES ON EACH COMPACT DISC SHALL BE SPECIFIED

Not Applicable.

BACKGROUND OF THE INVENTION

1. Field of the Invention

The presently claimed and disclosed invention(s) relate to a material property determination system, and an automated method of assigning material properties to image textures within a 3D model. More particularly, but not by way of limitation, the presently claimed and disclosed invention(s) uses an automated methodology to determine and assign material properties to images textures applied to the 3D model by comparing each texture to entries in a palette of material entries and assigning the material palette entry that best matches the one contained in the 3D model image texture.

2. Background of the Art

In the remote sensing/aerial imaging industry, imagery is used to capture views of a geographic area and be able to measure objects and structures within the images as well as to be able to determine geographic locations of points within the image. These are generally referred to as "geo-referenced images" and come in two basic categories:

1. Captured Imagery—these images have the appearance they were captured by the camera or sensor employed.
2. Projected Imagery—these images have been processed and converted such that they conform to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down.

It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

Technology advancements within the computerized three-dimensional modeling industry are providing avenues for physical simulation of real-life and hypothetical situations on computer systems. These models can provide valuable information for strategic and tactical planning. For example, three-dimensional models of city streets can provide first responders information regarding current city developments including entryway locations, building recognition, and the like. This information is valuable in reducing response time during emergency conditions. Further, emergency personal can train for emergency situations through simulated scenarios provided by or with the three dimensional models.

The introduction of metric oblique imagery by Pictometry International Corp. has led to the creation of very photo-realistic computerized 3D models by the use of regions within oblique images as textures on the buildings, structures, and objects in the 3D models. This practice not only results in computerized 3D models that are very visually pleasing, but they also contain information about the objects themselves, including clues to the material composition used to construct those objects.

Identifying the material composition is very important when using the 3D models for simulating real-life and hypothetical situations on computer systems, such as blast simulations, weapons penetration, radio wave propagation, signal reflectivity, and other scientific studies where the material composition comes into play in the calculations. Traditionally the properties of these materials have been entered by hand in a very laborious process where an operator selects an individual building or object in the model and then assigns the appropriate building material. Prior to the creation of photo-realistic 3D models from oblique images, this process could even involve field visits to determine the material composition.

It is highly desirable to automate this process, for two primary reasons: speed of production and cost savings. However, to date, an automated method has been elusive because while object or material recognition is a rather easy process for people, it is very difficult for computers. To date, most attempts at automated material classification have concentrated on multi-spectral image collection in hopes that enough color signatures can uniquely identify each material. However, in most cases, multi-spectral data is not available or is limited to only a few color bands and therefore insufficient to differentiate between materials.

SUMMARY OF THE INVENTION

This invention allows for the automated creation of a 3D model that has (1) a natural appearance, (2) material information stored in the 3D model and (3) is preferably georeferenced to maintain the ability to measure and determine geographic coordinates. While the preferred embodiment uses aerial oblique imagery for the textures, the invention will also work with non-aerial oblique imagery captured in a variety of ways, including but not limited to cameras mounted obliquely on a vertical pole, hand-held cameras aimed obliquely, and cameras mounted at oblique angles on an underwater probe, as well as other types of imagery such as nadir imagery.

In one version, the present invention is directed to a method of automatically transforming a computerized 3D model having regions of images utilized as textures on one or more physical objects represented in the 3D model (such as building sides and roofs, walls, landscapes, mountain sides, trees and the like) to include material property information for one or more regions of the textures of the 3D model. In this method, image textures applied to the 3D model are examined by comparing, utilizing a computer, at least a portion of each image texture to entries in a palette of material entries. The material palette entry that best matches the one contained in the image texture is assigned to indicate a physical material of the physical object represented by the 3D model. Then, material property information is stored in the computerized 3D model for the image textures that are assigned a material palette entry.

To improve the comparison between the texture and the entries in the material palette, the entries in the material palette can be modified such that their image resolution matches the image resolution contained in the 3D model image textures prior to comparison.

The material property information stored in the computerized 3D model can be stored in fields in the computerized 3D model data directly, or a unique identifier for the selected material palette entry, or an address to information where the selected material palette entry (or material property) is stored or identified, or other information associated with a material palette entry can be stored in the 3D model data and subsequently used to retrieve the material property information from a list or database of material properties.

The entries in the palette of material entries can be utilized to texture one or more of the physical objects within the computerized 3D model. That is, once the material palette entry that best matches the one contained in the image texture is assigned to indicate a physical material of the physical object represented by the 3D model, the material palette entry can be utilized as a simulated texture to replace or enhance the texture one or more physical objects represented in the 3D model the 3D model.

BRIEF DESCRIPTION OF THE SEVERAL VIEWS OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

The patent or application file contains at least one drawing executed in color. Copies of the patent or patent application publication with color drawing(s) will be provided by the Office upon request and payment of the necessary fee.

FIG. 4 illustrates a palette of building materials in accordance with the present invention, showing their numeric match value in relation to the selected building texture of FIG. 3, with the highest score highlighted.

FIG. 8 illustrates an exemplary palette of images representing a portion of a physical object, e.g. representative of types of glass, with a numeric match value in relation to the selected windows of FIG. 7, with the highest score highlighted.

DETAILED DESCRIPTION OF THE PRESENTLY DISCLOSED AND CLAIMED INVENTION

Figure 1:
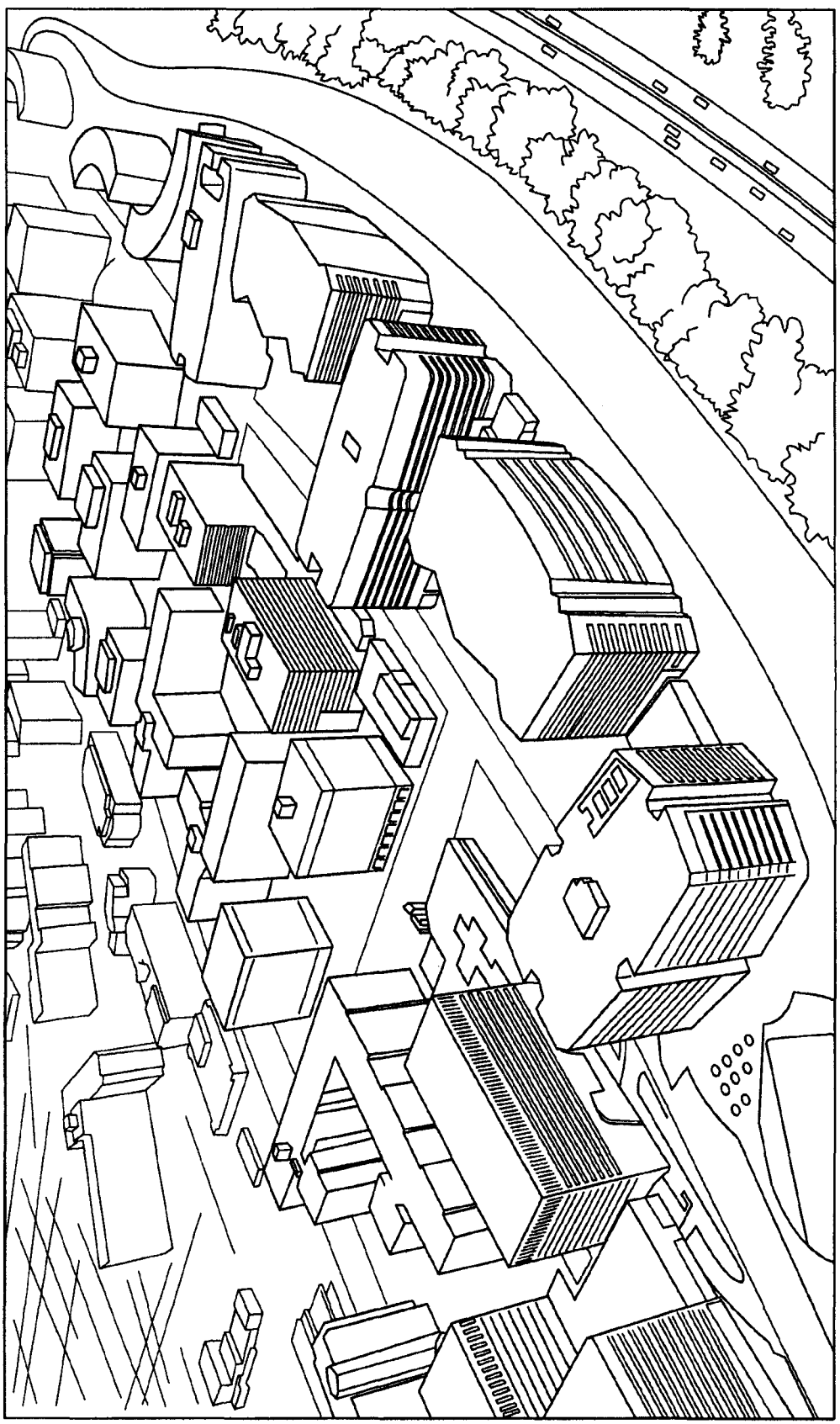
FIG. 1 illustrates an exemplary computerized 3D model with real world textures zoomed out to show photo-realism.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

The presently claimed and disclosed invention(s) relate to a material property determination system, and an automated method of assigning material properties to image textures within a 3D model. More particularly, but not by way of limitation, the presently claimed and disclosed invention(s) uses an automated methodology to determine and assign material properties to images textures applied to the 3D model by comparing each image texture to entries in a palette of images representing material entries and assigning the image representing the material palette entry that best matches the one contained in the 3D model image texture.

The term texture, as used herein refers to an image, e.g., a digital image, representing a surface, a material, a pattern or even a picture. The texture can be created in a variety of manners, such as being generated from a captured or projected image, or generated by an artist or a designer using a bitmap editor software such as Adobe® Photoshop® or Gimp or by scanning an image and, if necessary or desirable, retouching, color balancing, or otherwise processing it on a computer such as a personal computer, dedicated server or the like.

The texture can be in a suitable format, such as a bitmap format, or a vector format. The texture can be built as a large image, larger than the final destination (such as page, for example) so as to fill the complete area without repeating the image (thus avoiding visible seams). Also bitmap textures can be created to be used as repetitive patterns to fill an infinite area. The borders of these patterns or small textures should be treated to give a seamless appearance when applied to an image, unless, of course, the seam is something to be shown.

When designed for print, the textures should be created in high-resolution in order to achieve good results in the final print.

When the textures are meant to be used in multimedia, a 3D model or web design, they should be created in a maximum resolution that equals the one of the final display (TV, computer monitor, movie projector, etc.).

The term "palette of material entries" as used herein means a given, finite set of textures representative of material properties of physical materials. In particular, each material palette entry represents a particular type of physical material. As discussed in more detail below, the material palette entry that best matches a particular image texture in the computerized 3D model is assigned to the image texture to indicate a material property of the physical object represented by the 3D model.

The term "3D model" as used herein is a collection of data that represent a 3-dimensional object using a collection of points in 3D space, connected by various geometric entities such as triangles, lines, curved surfaces, etc. The geometric entities are sometimes called "wireframes" in the art. The 3D model can be created manually or automatically. One exemplary method for creating a 3D model is described in a United States patent application identified by U.S. Ser. No. 11/998,974 titled "SYSTEMS AND METHODS FOR RAPID THREE-DIMENSIONAL MODELING WITH REAL FACADE TEXTURE," the entire contents of which are herein incorporated by reference. The 3D model can be constructed in various manners, such as solid or shell, and can either be a stationary 3D model or animated.

In one version, the present invention is directed to a method of automatically transforming a computerized 3D model having portions of images utilized as textures on one or more physical objects represented in the 3D model to include material property information for one or more regions of the textures of the 3D model. See FIG. 1 as an example of such a 3D model having portions of images utilized as textures of one or more physical objects represented in the 3D model. In this method, image textures applied to the 3D model (or to be applied to the 3D model) are examined by comparing, utilizing a computer system 50 (see FIG. 11 as described below), at least a portion of each image texture to entries in a palette of material entries. The material palette entry that best matches the one contained in the image texture is assigned to the image texture to indicate a physical material of the physical object represented by the 3D model. Then, material property information is stored in the computerized 3D model for the image textures that are assigned a material palette entry.

To improve the comparison between the image textures and the entries in the material palette, the entries in the material palette can be modified such that their image resolution matches the image resolution contained in the 3D model image textures prior to comparison.

The material property information stored in the computerized 3D model can be stored in fields in the computerized 3D model data directly, or a unique identifier for the selected material palette entry, or an address to information where the selected material palette entry (or material property) is stored or identified, or other information associated with a material palette entry can be stored in the 3D model data and is subsequently used to retrieve the material property or structural element information from a list or database of material properties. For example, material property or structural element information can be stored as metadata within the 3D model, either appended to the same file or in another file readily accessible (an industry standard practice is to use the same filename but with a different file extension).

In another aspect of the present invention, the entries in the palette of material entries can be utilized to texture one or more of the image textures representing the physical objects within the computerized 3D model. That is, once the material palette entry that best matches the image texture is assigned to indicate a physical material of the physical object represented by the 3D model, the material palette entry can be utilized as a simulated texture to replace or enhance the image texture of one or more physical objects represented in the 3D model.

As would be understood in the art, the presently disclosed and claimed invention would provide the method to do material classification using color imagery (e.g., red, green, and blue color bands) through the use of oblique images. For example, the color oblique imagery is utilized to provide initial image textures for the 3D models and then a palette of possible building materials is compared to the image texture within the 3D model to automatically assign material properties to the portions of the image textures contained within the 3D model representing the physical objects, e.g., the buildings. These methods also provide a means to automatically size and position simulated textures of structural elements, e.g., windows, doors or the like, on the 3D model based on those detected in the actual imagery of textures representing the buildings.

This methodology offers a number of advantages. First, there is no need to do a special data collection in order to make the determinations—normal oblique imagery as textures can be used, such as that described in U.S. Pat. No. 5,247,356 entitled "Method and Apparatus for Mapping and Measuring Land". Second, the method of the present invention is highly automated, requiring only quality control and clean up of any false identifications. Third, by assigning building material properties to the palette of available materials, the resulting 3D model can be used for blast simulations and other analyses that require knowledge of the material composition in the model. Fourth, for applications that require simulated textures, the entry from the material palette can replace the actual oblique image texture in the 3D model, thereby greatly reducing the data content in the scene. Fifth, for applications that require extreme close-up views of the 3D model, the entry from the material palette can be used to produce higher resolution textures of the building than is possible from the original imagery.

Figure 2:
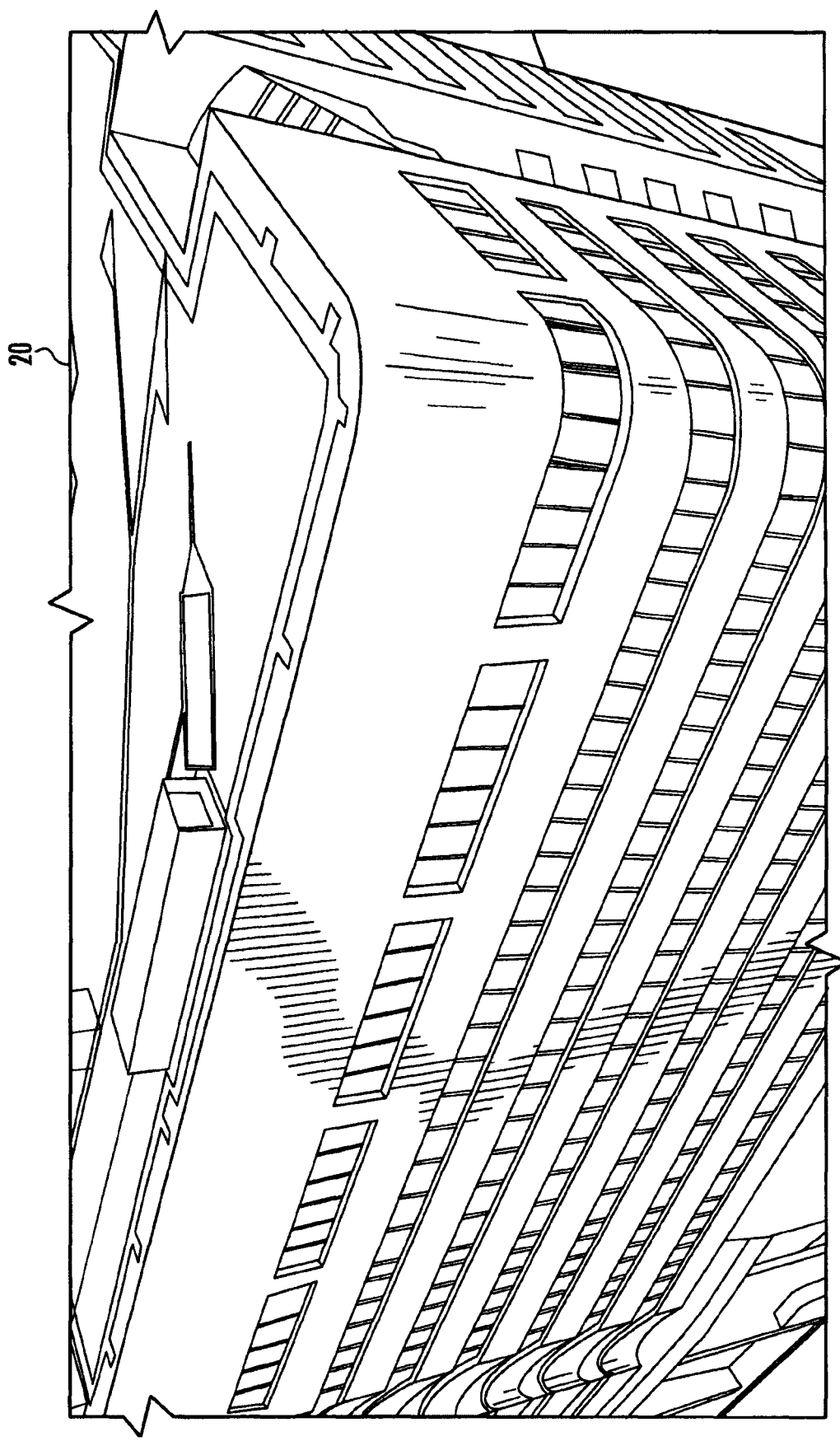
FIG. 2 illustrates a portion of the computerized 3D model depicted in FIG. 1 zoomed in such that the textures are pixilated.

The primary methodology includes the step of comparing a particular building texture with one or more, and preferably each, of the entries in the material palette and then selecting the entry with the best match. To improve on the success rate of the matching process, the entries in the material palette can optionally be pixilated to match the resolution of the actual texture in the 3D model representing the building. FIG. 2 shows a portion of a building 20 shown in FIG. 1 wherein the image is zoomed in to illustrate the pixilation that can occur with differing resolutions of images. This will help make sure that the algorithm is not confused by differences in resolution and differences in patterns caused by the differing resolution.

Figure 3:
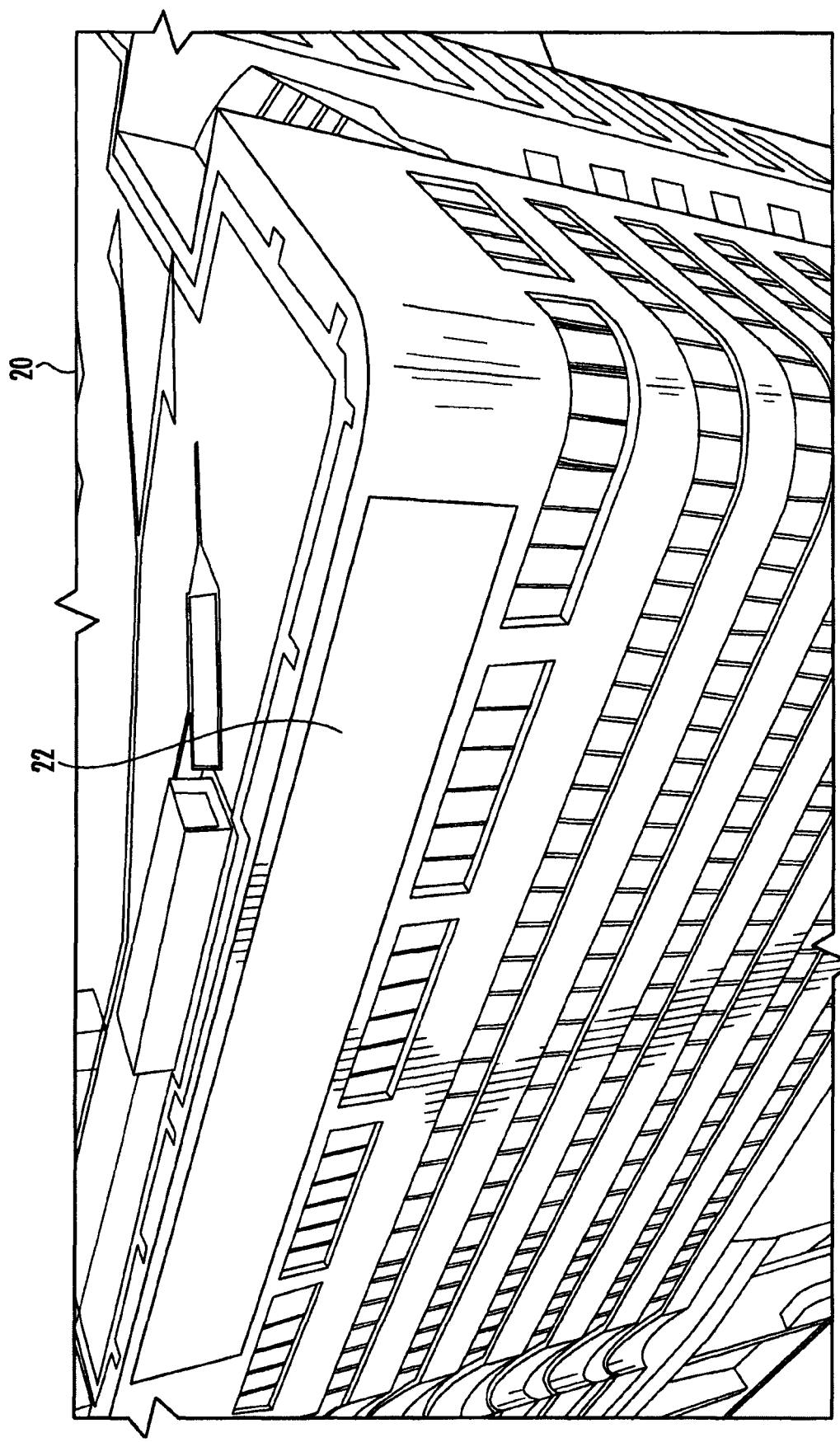
FIG. 3 illustrates a portion of the computerized 3D model depicted in FIG. 1 with one particular building texture highlighted and outlined using an edge detection algorithm.
Figure 7:
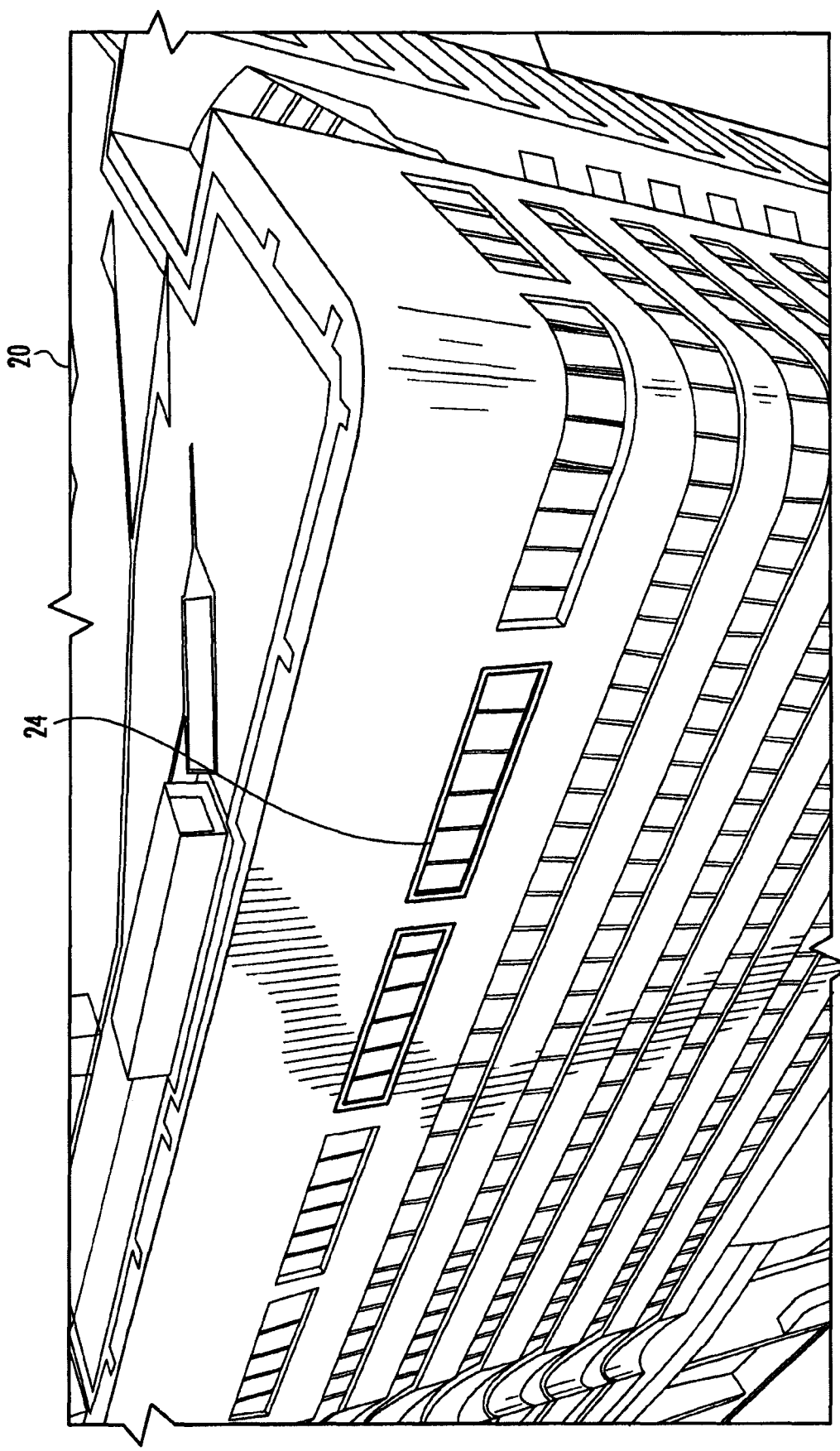
FIG. 7 illustrates a portion of the computerized 3D model depicted in FIG. 1 with two particular windows highlighted and outlined using an edge detection algorithm in accordance with the present invention.

A secondary optional methodology will use an edge detection algorithm to analyze the textures within the 3D model to locate representations of predetermined structural elements, such as structural features, windows and doors, or the absence of a predetermined structural element, such as a void or a hole. FIGS. 3 and 7 illustrate a structural feature (building surface 22 in FIG. 3) and windows 24 (FIG. 7) as detected and outlined by the edge detection algorithm. Once the representations of the predetermined structural elements are located within the textures, such representations of the structural elements are matched to entries in a palette of structural elements textures in a similar methodology as discussed above in order to find the structural element that best matches the representation of the one found in the image texture. In this approach, the size and position of structural element (building surface 22 in FIG. 3 or windows 24 in FIG. 7) will be recorded and the selected entry will then be sized and positioned to match.

In both methods, the material information or structural element information added to the 3D model in accordance with the present invention, such as the material information from the palette entry or the identification, size and position of the structural element, can be stored in fields in the computerized 3D model data directly, or one or more unique identifier(s) for the material or structural element information can be added, or an address to information where the material or structural element information is stored or identified, or other information associated with a material palette entry or structural element entry can be stored in the 3D model data and subsequently used to retrieve the material property information or structural element information from a list or database of material properties.

In practice, the methodology disclosed and claimed herein, consists of multiple steps and data transformations that can be accomplished by one of ordinary skill in the art given the present specification. There are a number of algorithms already known in the art that can scan the textures within the 3D model to locate the structural elements. In addition, follow-on work could create new algorithms specifically designed to deal with the complexities of oblique images.

The textures and the entries in the palettes can be stored in any format; including one of many industry standard image formats such as TIFF, JFIF, TARGA, Windows Bitmap File, PNG or any other industry standard format. FIGS. 4 and 8 illustrate such palette entries wherein the image textures selected and outlined in FIGS. 3 and 7 (building surface 22 in FIG. 3 or windows 24 in FIG. 7) have been compared to the palette entries and the resulting comparison value is indicated next to each palette entry. As would be understood, the palette entry with the highest comparison value would be selected as the palette entry which corresponds to the selected image textures of FIGS. 3 and 7.

Figure 5:
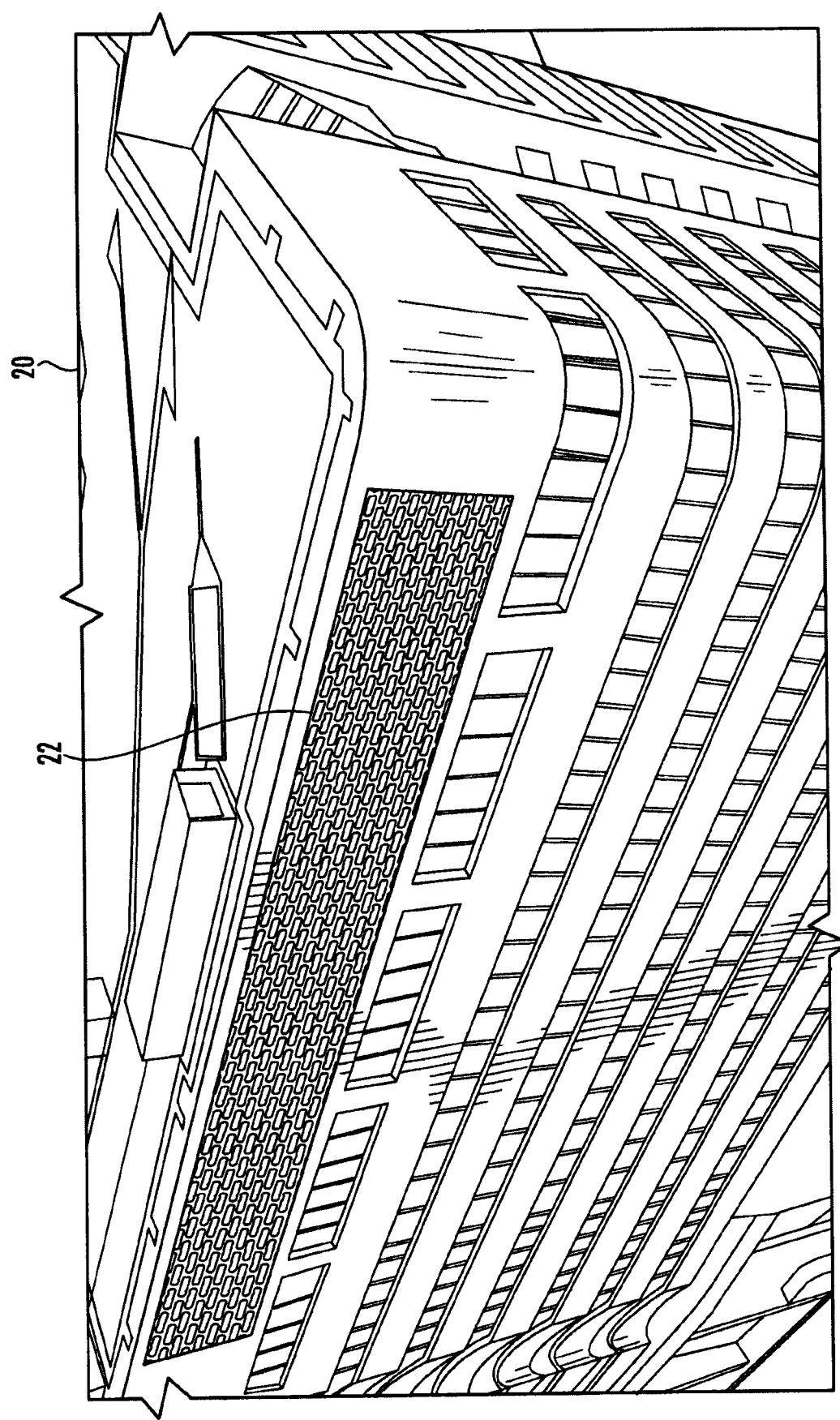
FIG. 5 illustrates the computerized 3D model depicted in FIG. 3 with a real world texture replaced with a simulated texture in accordance with the present invention, and building material properties in a table off to the side.
Figure 9:
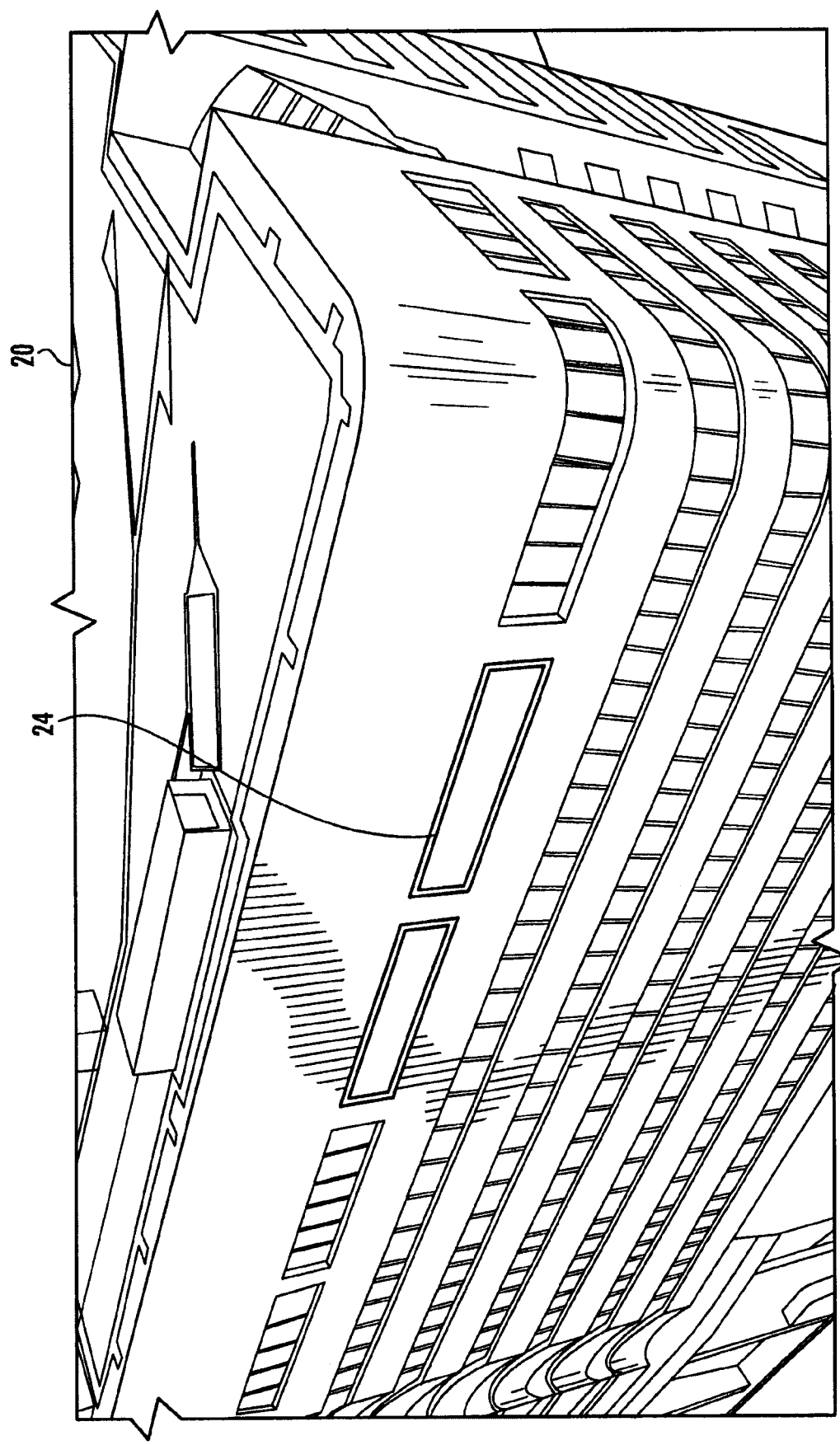
FIG. 9 illustrates the computerized 3D model depicted in FIG. 1 with the images of the real world windows replaced with their simulated versions.

As discussed above, a further methodology of the present invention permits the application of the texture contained in the palette entries corresponding to the selected image textures to the 3D model so as to improve the useable resolution of the 3D model. As would be understood, the application of the palette texture to the 3D model of the structure would permit a user of the present methodology to zoom in to the particular structure, e.g., the building 20 of FIG. 2, represented within the 3D model without the pixilation that would be normally be present. For example, FIGS. 5 and 9 illustrate the application of the palette textures to the selected and outlined image textures of FIGS. 3 and 7 (building surface 22 in FIG. 3 or windows 24 in FIG. 7).

Figure 6:
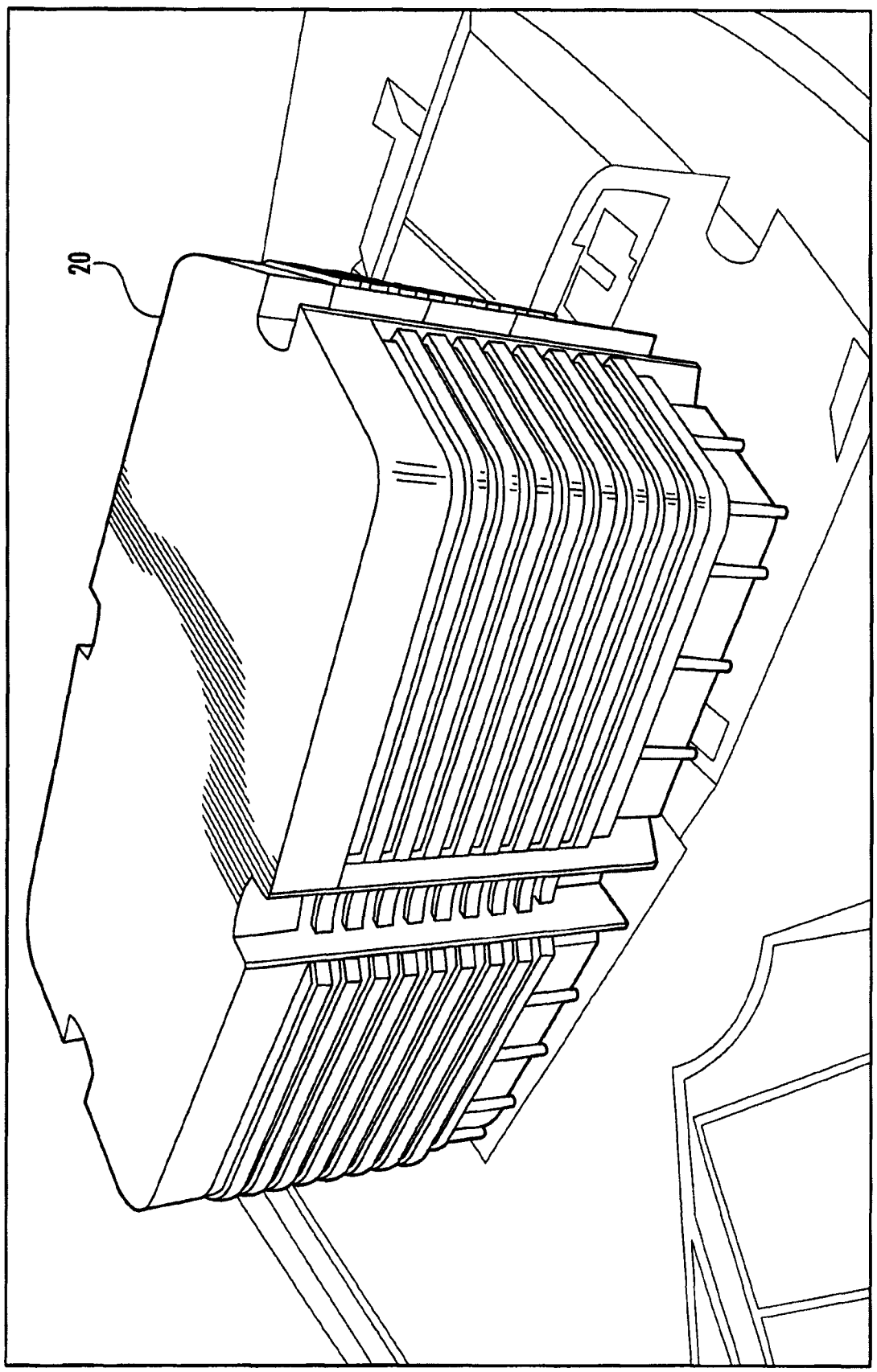
FIG. 6 illustrates a portion of the computerized 3D model depicted in FIG. 1 with the real world and simulated textures combined in accordance with the present invention.
Figure 6A:
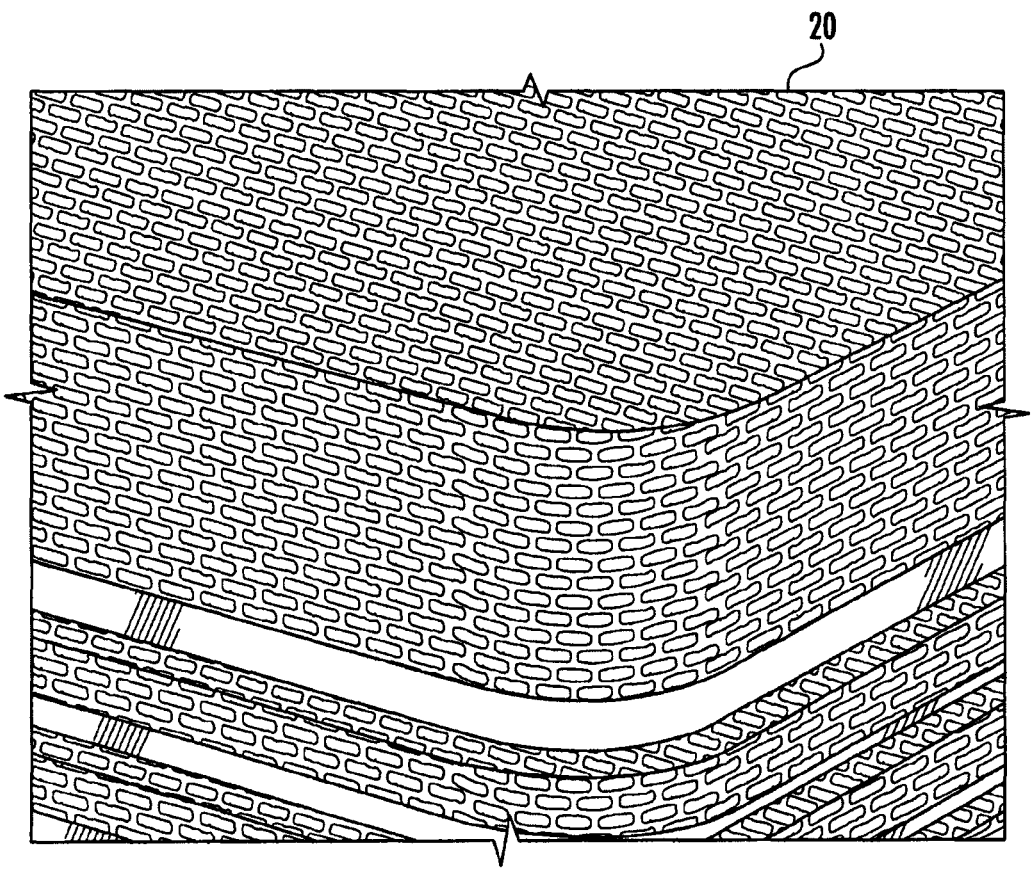
FIG. 6a is a zoomed in diagram of the model depicted in FIG. 6.

On a larger scale, FIG. 6 illustrates the building 20 shown in FIG. 2 wherein the original digital oblique image applied to and representing the building within the 3D model has been completely replaced by the palette texture as described above. FIG. 6a illustrates the same building 20 zoomed in so as to show the palette texture in greater detail. As can be seen, the zoomed in image shown in FIG. 6a is free from the normal pixilation as shown in the zoomed in image of FIG. 2.

As described above, the selected and outlined image textures would also be assigned the material properties associated with the palette entry corresponding to the image texture. In the case of the building 20 shown in FIG. 6, the image texture replaced by the palette texture would also include the associated material properties.

Figure 10:
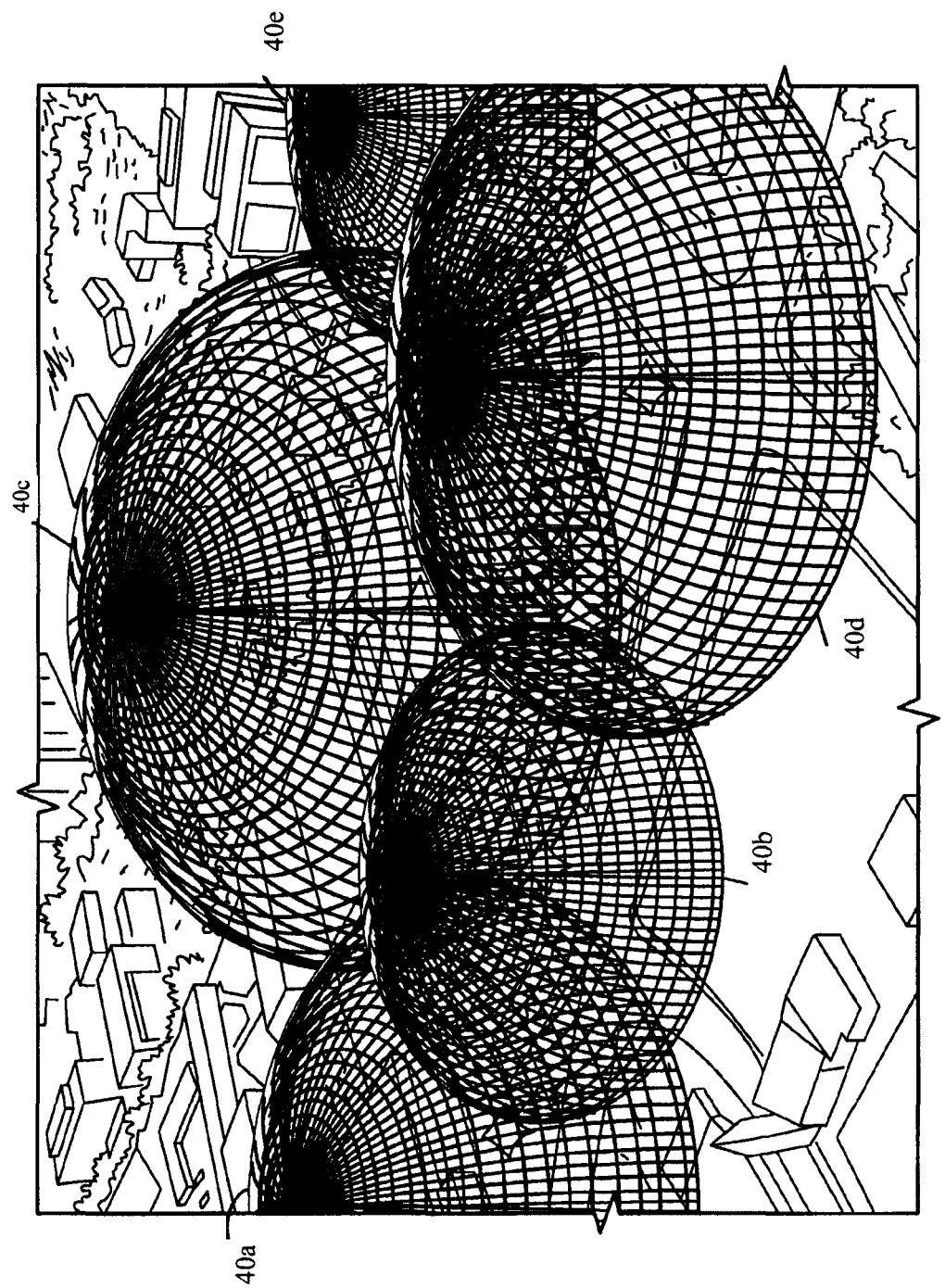
FIG. 10 illustrates a blast analysis model inside a 3D model.

Referring now to FIG. 10, the output model could also be loaded into an analysis tool such as Lockheed Martin's TOPSCENE with a plurality of threat domes 40 (shown individually as 40a-40e) overlaid on top of the 3D model. Building material attribution, i.e., consideration of the building material properties, on the 3D model would increase the predictive capability of a blast or ballistic penetration analysis. Threat domes 40a-40e would be understood to vary in size depending on the building material property assigned to a particular building for a given blast penetration analysis. That is, an analysis tool could take the material property assigned to structure(s) into consideration when analyzing different scenarios, e.g., a blast scenario, in order to provide improved predictive capabilities. For example, a blast occurring inside a structure constructed with glass walls would readily be understood to result in a different blast scenario than a similar blast occurring inside a structure constructed with brick walls.

Figure 11:
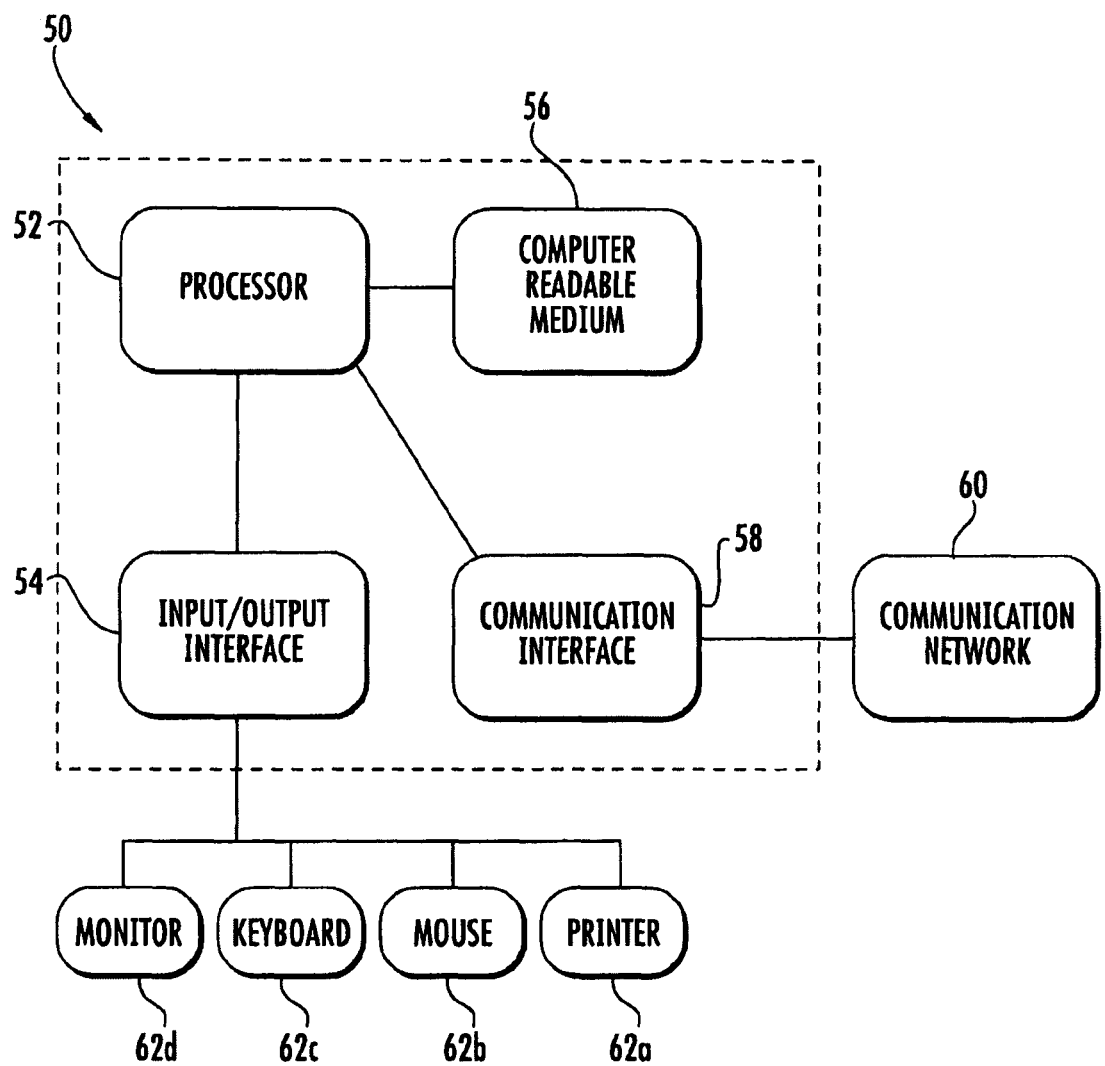
FIG. 11 is a block diagram of a computer system as used in the present invention.

It should be understood that the processes described above can be performed with the aid of a computer system 50 running image processing software adapted to perform the functions described above, and the resulting images and data are stored on one or more computer readable mediums. FIG. 11 illustrates a block diagram of an exemplary embodiment of a computer system 50 constructed in accordance with the present invention. The computer system 50 includes a processor 52 in communication with a computer readable medium 56, an input/output interface 54 and a communication interface 58. The input/output interface 54 is further in communication with input/output devices 62a-d. As would be understood in the art, the computer system 50 can further utilize additional input/output devices (not shown) which would permit a user to enter, process and produce an output of a 3D model constructed in accordance with the present invention. For example, the computer system 50 could further include a digital tablet, an optical scanner, an external computer readable medium and the like.

The communication interface 58 is in communication with communication network 60. Communication network 60 provides a mechanism for the computer system 50 to transmit and/or receive information between the computer system 50 and external devices/systems, such as digital images, 3D models and the like. Communication network 60 can be implemented using any commonly available communication mediums, such as wireless, wired, TCP/IP, fiber optic and the like.

Computer readable medium 56 permits storage and retrieval of digital information (data) and also computer executable code as utilized in the present invention. Examples of a computer readable medium 56 include an optical storage device, a magnetic storage device, an electronic storage device or the like.

As would be understood in the art, the term "Computer System" as used herein means a system or systems that are able to embody and/or execute the logic of the processes described herein. The logic embodied in the form of software instructions or firmware may be executed on any appropriate hardware which may be a dedicated system or systems, or a general purpose computer system, or distributed processing computer system, all of which are well understood in the art, and a detailed description of how to make or use such computers is not deemed necessary herein. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the images, or thereafter or combinations thereof.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A method of automatically creating a computerized 3D model to include material property information for one or more regions of image textures of the computerized 3D model, comprising the steps of:
creating a computerized 3D model having image textures;
examining, using computer executable code executed on a computer, a portion of a first image texture of the computerized 3D model having unknown material properties, by:
comparing, using computer executable code executed on the computer, the portion of the first image texture to second texture images of material entries in a palette of material entries stored on a non-transitory computer readable medium to determine a best match for the first image texture, the palette of material entries comprising a set of the second texture images having simulated textures, the second texture images associated with material properties of physical materials, the material properties having material property information about the physical materials; and
assigning the material entry in the palette that best matches the portion of the first image texture to the first image texture to indicate a physical material of a physical object represented by the portion of the first image texture;
storing the material property information of the assigned material entry that best matched the portion of the first image texture; and
associating the material property information with the portion of the first image texture of the computerized 3D model and replacing the portion of the first image texture with the simulated texture of the assigned material entry.

2. The method of claim 1, wherein the method comprises the step of modifying an image resolution of at least one of the first image texture and the second texture images of the material entries in the palette of material entries to match, prior to the step of comparing the first image texture to the second texture images of the material entries in the palette of material entries.

3. The method of claim 1, wherein the material property information is stored in fields in the computerized 3D model.

4. The method of claim 1, wherein the stored material property information includes a unique identifier for the assigned material entry and wherein the method further comprises the step of retrieving the material property information from a list or database of material properties using the unique identifier.

5. The method of claim 1, wherein the first image texture is based at least in part on imagery captured by a camera.

6. The method of claim 5, wherein the imagery is aerial imagery.

7. The method of claim 5, wherein the imagery is imagery captured by one or more hand-held camera.

8. The method of claim 5, wherein the imagery is one or more of nadir imagery and oblique imagery.

9. A method of automatically creating a computerized 3D model, comprising the steps of:
using a computer system to perform the steps of:
creating a computerized 3D model having image texture;
locating, with one or more processors executing computer executable instructions stored on one or more non-transitory computer readable medium, image texture representations of structural roof elements in the 3D model, utilizing an edge detection algorithm on the 3D model;
examining, using computer executable code executed on the computer system, at least a portion of the image texture representations of structural roof elements in the 3D model, by:
comparing, with the one or more processors executing computer executable instructions stored on the one or more non-transitory computer readable medium, the image texture representations of structural roof elements in the 3D model to simulated textures of entries in a palette of structural element textures representing structural elements stored on the computer system to determine best matches for the examined portion of the image texture representations of the structural roof elements in the 3D model;
assigning, with the one or more processors executing computer executable instructions stored on the one or more non-transitory computer readable medium, the entries in the palette of structural element textures with the best match to the examined portion of the image texture representations of the structural roof element found in the 3D model;
associating, with the one or more processors executing computer executable instructions stored on the one or more non-transitory computer readable medium, material property information about the material from the entries in the palette of structural element textures with the best match with the 3D model at the same size and position as the examined portion of the image texture representations of the structural roof elements as found in the 3D model by the edge detection algorithm; and
replacing, with the one or more processors executing computer executable instructions stored in the one or more non-transitory computer readable medium, in the 3D model the image texture representation of the structural roof elements with the simulated texture of the entries in the palette of structural element textures with the best match.

10. The method of claim 9, further comprising the step of modifying an image resolution of the simulated textures of entries in the palette of structural element textures to match an image resolution of the image texture of the 3D model.

11. The method of claim 9, wherein the step of associating material property information is defined further as storing material property information of the entries in the palette of structural element textures with the best match in a field in the computerized 3D model directly.

12. The method of claim 9, wherein the step of associating material property information is defined further as the steps of storing a unique identifier for the entries in the palette of structural element textures with the best match in the computerized 3D model and subsequently using the unique identifier to retrieve the material property information from at least one of a list and a database of material properties.

13. The method of claim 9, wherein the simulated textures have an image resolution greater than an image resolution of the image texture of the 3D model.

14. A system for automatically creating a computerized 3D model to include material property information for one or more regions of image textures of the computerized 3D model, the system comprising:
    a computer comprising;
        a processor; and
        a non-transitory computer readable medium storing computer executable code that when executed by the processor causes the computer to:
            create a computerized 3D model having image texture;
            examine at least a portion of a first image texture of the computerized 3D model having unknown material properties, by comparing the first image texture to second texture images of material entries in a palette of material entries stored on the non-transitory computer readable medium, the palette of material entries comprising a set of the second texture images having simulated textures, the second texture images associated with material properties of physical materials, the material properties having material property information about the physical material;
        determine the material entry in the palette with a best match for the first image texture;
        assign the material entry in the palette that best matches the first image texture to the 3D model at the same size and position as the examined portion of the first image texture to indicate a physical material represented by the examined portion of the first image texture, the non-transitory computer readable medium storing the material property information of the assigned material entry; and
        replace the portion of the first image texture with the simulated texture of the assigned material entry.

15. The system of claim 14, wherein the material property information of the assigned material entry is stored in fields in the computerized 3D model.

16. The system of claim 14, wherein the material property information includes a unique identifier for the assigned material entry and wherein the non-transitory computer readable medium further stores computer executable code that when executed by the processor causes the computer to retrieve the material property information from a list or database of material properties using the unique identifier.

17. The system of claim 14, wherein the first image texture is based at least in part on imagery captured by a camera, and wherein the imagery is one or more of oblique imagery, nadir imagery, aerial imagery, and captured by one or more hand-held camera.

\* \* \* \* \*